(12) United States Patent
Thakker (10) Patent No.: US 11,138,623 B2
(45) Date of Patent: Oct. 5, 2021

(54) SYSTEMS AND METHODS FOR AUTHENTICATING, TRACKING, AND REWARDING WORD OF MOUTH PROPAGATION

(71) Applicant: Mitesh L Thakker, Mumbai (IN)

(72) Inventor: Mitesh L Thakker, Mumbai (IN)

( * ) Notice: Subject to any disclaimer, the term of this patent is extended or adjusted under 35 U.S.C. 154(b) by 931 days.

(21) Appl. No.: 14/402,520

(22) PCT Filed: May 22, 2013

(86) PCT No.: PCT/IB2013/054229
§ 371 (c)(1),
(2) Date: Nov. 20, 2014

(87) PCT Pub. No.: WO2013/175410
PCT Pub. Date: Nov. 28, 2013

(65) Prior Publication Data
US 2015/0149267 A1      May 28, 2015

(30) Foreign Application Priority Data
May 22, 2012   (IN) .......................... 1556/MUM/2012

(51) Int. Cl.
*G06Q 30/02*   (2012.01)
*G06Q 50/00*   (2012.01)

(52) U.S. Cl.
CPC ..... *G06Q 30/0214* (2013.01); *G06Q 30/0207* (2013.01); *G06Q 30/0242* (2013.01); *G06Q 30/0282* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 8,180,804 | B1* | 5/2012 | Narayanan | ........ G06F 16/24575 707/798 |
| 2002/0062249 | A1* | 5/2002 | Iannacci | .............. G06Q 20/105 705/14.1 |
| 2002/0111856 | A1* | 8/2002 | Messer | .............. G06Q 30/0214 705/14.16 |

(Continued)

OTHER PUBLICATIONS

14. Waltl ("Semantic Tagset Generation and Enrichment by Measuring Co-Occurrences in Online Social Networks," Master's Thesis for studies in Interactive Media in Hagenberg, Sep. 2014) (Year: 2014).*

(Continued)

*Primary Examiner* — Christopher B Tokarczyk
(74) *Attorney, Agent, or Firm* — D'Ambrosio & Menon, PLLC; Usha Menon (57) ABSTRACT

According to this invention, there is provided a system and method for authenticating, tracking, and rewarding word of mouth propagation, said system and method comprising a system/module for accessing social graph index; a system/module for accumulating points and incentivizing word of mouth propaganda; a system/module for WOM membership platform (coalition Social Loyalty Platform); a system/module for WOM counts equity program; a system/module for brand assurance; and a system/module for creating certified and ranked registry of users.

1 Claim, 7 Drawing Sheets (56) References Cited

U.S. PATENT DOCUMENTS

| | | | | |
|---|---|---|---|---|
| 2003/0220835 A1* | 11/2003 | Barnes, Jr. | ......... | G06Q 10/1053 |
| | | | | 705/14.36 |
| 2007/0121843 A1* | 5/2007 | Atazky | .................. | H04L 51/32 |
| | | | | 379/114.13 |
| 2009/0171755 A1* | 7/2009 | Kane | .................. | G06Q 30/0601 |
| | | | | 705/14.16 |
| 2011/0035278 A1* | 2/2011 | Fordyce, III | ....... | G06Q 30/0267 |
| | | | | 705/14.49 |
| 2012/0096002 A1* | 4/2012 | Sheehan | ................ | G06Q 10/10 |
| | | | | 707/737 |
| 2012/0316941 A1* | 12/2012 | Moshfeghi | ............. | G06Q 30/02 |
| | | | | 705/14.16 |
| 2015/0142767 A1* | 5/2015 | Wu | ....................... | G06F 16/951 |
| | | | | 707/706 |

OTHER PUBLICATIONS

PCT/IB2013/054229—International Search Report.

* cited by examiner

SYSTEMS AND METHODS FOR AUTHENTICATING, TRACKING, AND REWARDING WORD OF MOUTH PROPAGATION

FIELD OF THE INVENTION

This invention relates to the field of computational systems and information systems. Particularly, the present invention relates to the field of advertisement tracking and network based social media activities. More particularly, this invention relates to systems and methods for authenticating, tracking, and rewarding word of mouth propagation.

BACKGROUND

For a market driven economy, it is essential that products and services brought out in the market are well marketed and promoted effectively, for which multiple strategies are adopted by companies and businesses. One of the major channels of marketing and promoting products, services or business is now through Internet and online mediums.

In the current internet/knowledge era, Internet paved the way for one level of instantaneous communication flow. The network of computing devices and web-pages has become a popular and important medium for carrying out various day-to-day activities. Further, popularity and conformance of users to social media sites has paved the way for another level of instantaneous flow between users. With the advent of mobile computing portals such as laptops, smart phones, Internet enabled phones and devices, palmtops, PDAs, and the like, and with the supplementing advent of a plurality of applications, activities on social media sites have become increasingly real-time. Hence, real-time people interaction has increased and particularly growingly through social media or social networks. The common elements of social media would include, but is not limited to, social networks, chatting tools and forums, messaging services, web logs, personal pages, user review sites, deal aggregators, gaming consoles, discussion forums, file sharing interfaces, online magazines, online surveys and blogs etc. These elements are now being used widely by users to maximize their visibility, draw feedback, research product and marketing ideas, reach potential customers, address existing customers and resolve issues.

The key tool for marketing and promoting products and services are direct Advertisements and advertisement platforms employed by the business owner or the company directly to the target consumer. The field of advertising is growingly becoming intense and complex with regards to consumer perception and behavior, and thus effective strategies need to be deployed for targeted advertising and effective promotion of products and services. Understanding consumer behavior and consumer perception is one of the key aspects in enabling effective and targeted advertising. Consequently, companies spend huge amounts in understanding consumer behavior. Mostly, such data of consumer behavior is collated by means of online and offline surveys or through customer integration or through some level of data access through the Internet in relation to the user. For this, tools involving tracking user activity or click stream of a user to determine or estimate the user behavior or user interest have been developed to help companies focus on effective targeted advertising. This typically is referred to as Social Graph Indexing or Social Graph Integration or User Behavior Tracking.

Another practice that is important for business promotion is the use of referrals also termed as 'word of mouth' (WOM) propagation. This, in many ways, is an honest reproduction of customers' sentiments towards the company, the product, or the service. 'Word of mouth' propagation typically involves a first person receiving review or reference of a product or service from a known and trusted other person or a group of known and trusted other persons, generally the other person being a friend, relative, colleague or acquaintance. In the online platform, reviews, recommendations, ratings, surveys, form the fractals of word of mouth propaganda. Mostly, the reviews, recommendations, ratings, surveys, more or less, involve digital media or the Internet as a medium of display or sharing or communication. The content on this medium is, however, alterable or changeable or susceptible to rigging by third parties not involved in purchasing or using the various products or services, but are involved in building a 'reputation' for a company or product or service. In contrast to the on-line medium, the offline or inter-personal word of mouth propaganda is a medium which is relatively un-tracked and hence, relatively less susceptible to rigging or altering or manipulating as compared to the on-line medium.

There are certain diagnostic tools available which use social media activity data to generate analytics output such as reports, trends, patterns, frequency charts etc. which are used for analyzing and understanding the performance of a social media element. These are normally used by businesses or individuals in understanding the user behavior, perception, interest and feedback, which is further by way of manual interpretation used to derive actionable points to increase or improve the quality and quantity of interaction with users or prospective users of the social media element.

In the marketing domain, typically, leads are generated. 'Leads' relate to potential clients. The technical challenge lies in tracking/tracing the conversion of leads into active clients. In the current state of art, there are no effective systems or methods which provide the solution to aid in this tracing the conversion, which solution involves offline as well as online mediums of interfacing, tracking, and analyzing.

Another growing trend in the marketing arena is the advent and popularity of Loyalty Programs which ordinarily involve distribution of Reward points, Equity, Membership, Cash Back, Gifts, Offers, Discounts and the like.

Another area of marketing concerns with Brand Assurance and Brand Coupling where there are joint offers or joint approaching of targeted customer using complimenting products or services of two different brands which benefits the consumer as well as the seller.

In the current state of art, there are no effective systems or methods which provide the solution to aid in this tracing the conversion, which solution involves offline as well as online mediums of interfacing, tracking, and analyzing.

Another limiting factor of the prior art is that there are no systems or methods which warrant or solicit authenticated or original propaganda of a company or a product or a service, which propaganda relates to reviews, recommendations, referrals, ratings, comments, or the like.

Particularly, there is no system and methods in the present art which provides a platform to create a synergistic online marketing system wherein Word of Mouth is propagated and incentivized along with use of multiple marketing strategies.

The present invention in its various embodiments, aims to address the above drawbacks and requirements, and provide effective systems and methods for providing a systems and methods for authenticated and traceable word of mouth propagation.

OBJECTS OF THE INVENTION

An object of this invention is to provide a system and method for warranting authenticated propaganda of a company, a product, or a service, which propaganda involves the offline world as well as the online world.

Another object of the invention is to provide a system and method for incentivizing warranted and authenticated propaganda of a company, a product, or a service, which propaganda involves the offline world as well as the online world.

Yet another object of the invention is to provide a system and method which provides access to a user's social graph index irrespective of the medium of initial communication of interest (offline mode or online mode) and employ the same in warranting authenticated propaganda of a company, a product, or a service, which propaganda involves the offline world as well as the online world.

Yet another object of the invention is to provide a system and method for certifying a company, a product, a service or user based on authentic rating, review and social behavior tracked on the platform and employ the same in warranting authenticated propaganda of a company, a product, or a service, which propaganda involves the offline world as well as the online world.

Still another object of the invention is to provide a system and method which a system and method for warranting authenticated propaganda of a company, a product, or a service, which system and method is a traceable system.

SUMMARY

For the purposes of this specification, the term, 'activity' is meant to include any kind of action on a page of a social network or social media platform. According to a non-limiting exemplary embodiment, on a page hosted by FACEBOOK, activities may include the action of updating a status message in relation to a product, a service, a company, or a brand; liking or commenting on a product, or a service, or a company, or a brand; uploading and sharing a photo of a product, or a service, or a company, or a brand; uploading and sharing a link of a product, or a service, or a company, or a brand; and the like. According to another non-limiting exemplary embodiment, on a page hosted by TWITTER, activities may include the action of tweeting or re-tweeting in relation to a product, or a service, or a company, or a brand, and the like. According to yet another non-limiting exemplary embodiment, on a page hosted by LINKEDIN or PINTEREST or like, activities may include the action of starting a discussion thread in relation to a product, or a service, or a company, or a brand; commenting on a discussion thread of a product, or a service, or a company, or a brand, and the like. The activities include any of the activities, but not related to social media fan page activity, social media application activity, social media timeline activity, and the like. The types of 'activities', for each social networking platform, are pre-defined and pre-populated into the system of this invention.

According to this invention, there is provided a system and method for authenticating, tracking, and rewarding word of mouth propagation, said system and method comprising:
system/module for accessing social graph index;
system/module for accumulating points and incentivizing word of mouth propaganda;
system/module for WOM membership platform (coalition Social Loyalty Platform);
system/module for WOM counts equity program;
system/module for brand assurance; and
system/module for creating certified and ranked registry of users.

BRIEF DESCRIPTION OF THE DRAWINGS

The invention will now be described in relation to the accompanying drawings, in which.

DETAILED DESCRIPTION

According to this invention, there is provided systems and methods for authenticating, tracking, and rewarding word of mouth propagation.

Figure 1:
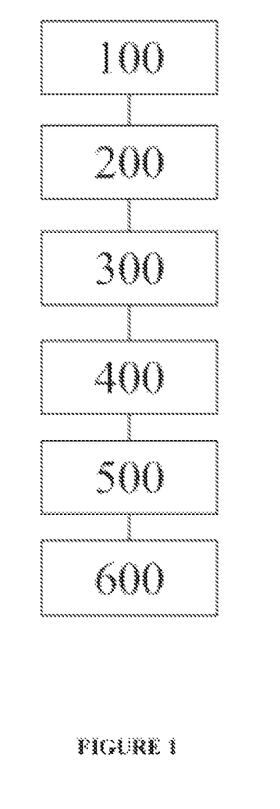
FIG. 1 illustrates a system for authenticated and traceable word of mouth propagation.

FIG. 1 illustrates a system for authenticated and traceable word of mouth propagation.

In accordance with an embodiment of this invention, there is provided a system/module for accessing social graph index (100).

Figure 2:
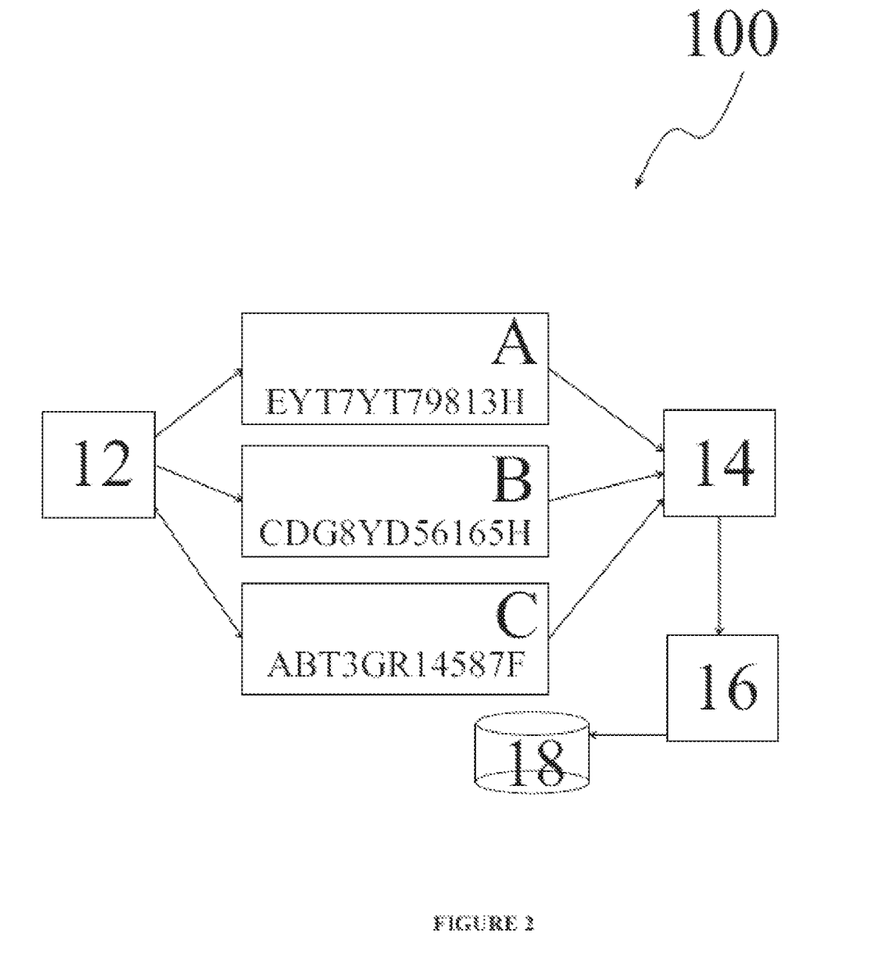
FIG. 2 illustrates a system/module for accessing social graph index.

FIG. 2 illustrates a system/module for accessing social graph index (100). In accordance with an embodiment of the system/module for accessing social graph index (100), there is provided a tracking reference numeral generator (12) adapted to generate reference numerals for purposes of tracking.

In an embodiment of the invention, the purpose of tracking, each advertisement (A, B, C) is, typically, tagged with a reference numeral (EYT7YT79813H, CDG8YD56165H, ABT3GR14587F). This reference numeral follows a pre-determined format, which format encodes information relating to an advertisement location and/or placement in one of the plurality of options of placing an advertisement. At the decoding end, the receipt of a reference numeral aids in decoding the location of the advertisement which led to a lead generation or a lead conversion. This helps in advertisement tracking and advertisement analytics. A brand or a company may place a pre-defined number of advertisements on on-line media as well as on off-line media. Each advertisement is uniquely laced with an encoded reference numeral. A user who is referring to an advertisement or using the advertisement also uses the reference number, thereby aiding an advertisement placer to track the user and advertisement placement locations which aid lead conversion or lead to sale conversion. This is done by a tracking mechanism (14). According to one exemplary embodiment, a user generates a lead enquiry by placing a call to a pre-defined number (advertised on the advertisement), prompting the user to quote or key the laced reference number, thereby allowing the system to recognize the source of the advertisement which lead to specific user-lead-enquiry.

In an embodiment of the invention, the tracking mechanism (14) is used to track and record data and metadata related to an activity carried out by a user. The said data and metadata is used by MODULE FOR ACCESSING SOCIAL GRAPH INDEX (100) to derive a social graph associated with a user. A tracking reference numeral may be used for one or more of tracking and recording of data and metadata related to an activity carried out by a user.

In accordance with an embodiment of the system/module for accessing social graph index (100), there is provided a social media plugin (16) adapted to prompt a user to allow the system to access a user's social media profile. Typically, the social media plugin is communicably coupled with a points' bank (18) adapted to allow a user to collect pre-defined number of points for allowing social media access. These points, typically, are loyalty points or reward points for the purpose of this invention being referred to as WOM (Word Of Mouth) points. Due to social media plugin, the system allows access to social media graph of a user along with personal data of a user. Since a social media graph contains and will contain valuable user behavior pattern, the system may be able to iterate and/or predict user behavior in relation to product and service usage/consumption/purchase or the like activities; either in the online world or in the offline world.

In accordance with an embodiment of the system/module for accessing social graph index (100), may comprise an 'interest and social pattern module' and an 'interest and social pattern database', wherein the 'interest and social pattern module' is used to correlate the data and metadata related to an activity carried out by a user tracked and recorded by the tracking mechanism with one or more interests or social behavior aspect of a user based on a predefined algorithm and a previously stored set of interests and social behavior aspects, wherein the previously stored set of interests and social behavior aspects are stored in the 'interest and social pattern database', and wherein after correlation of data and metadata related to an activity carried out by a user tracked and recorded by the tracking mechanism results into selection of one or more interest and social behavior aspect for said user which constitutes an 'interest and social pattern data-point' for said user.

In accordance with an embodiment of the system/module for accessing social graph index (100), is linked to a social graph index database which stores information linked to one or more users, the 'interest and social pattern data-point' for said one or more users.

The term reference numeral for the purpose of this invention deems to include a string of characters, the characters comprising, alphabets, numbers, special characters, symbols and a combination thereof.

In accordance with an embodiment of the invention, system/module for accessing social graph index (100) employs a Social network aggregator In accordance with an embodiment of the invention, system/module for accessing social graph index (100) utilizes clickstream data of a user.

In accordance with an embodiment of the invention, system/module for accessing social graph index (100) employs geotagging.

The term geotagging for the purpose of this invention means the process of adding geographical identification to data or metadata.

Figure 3:
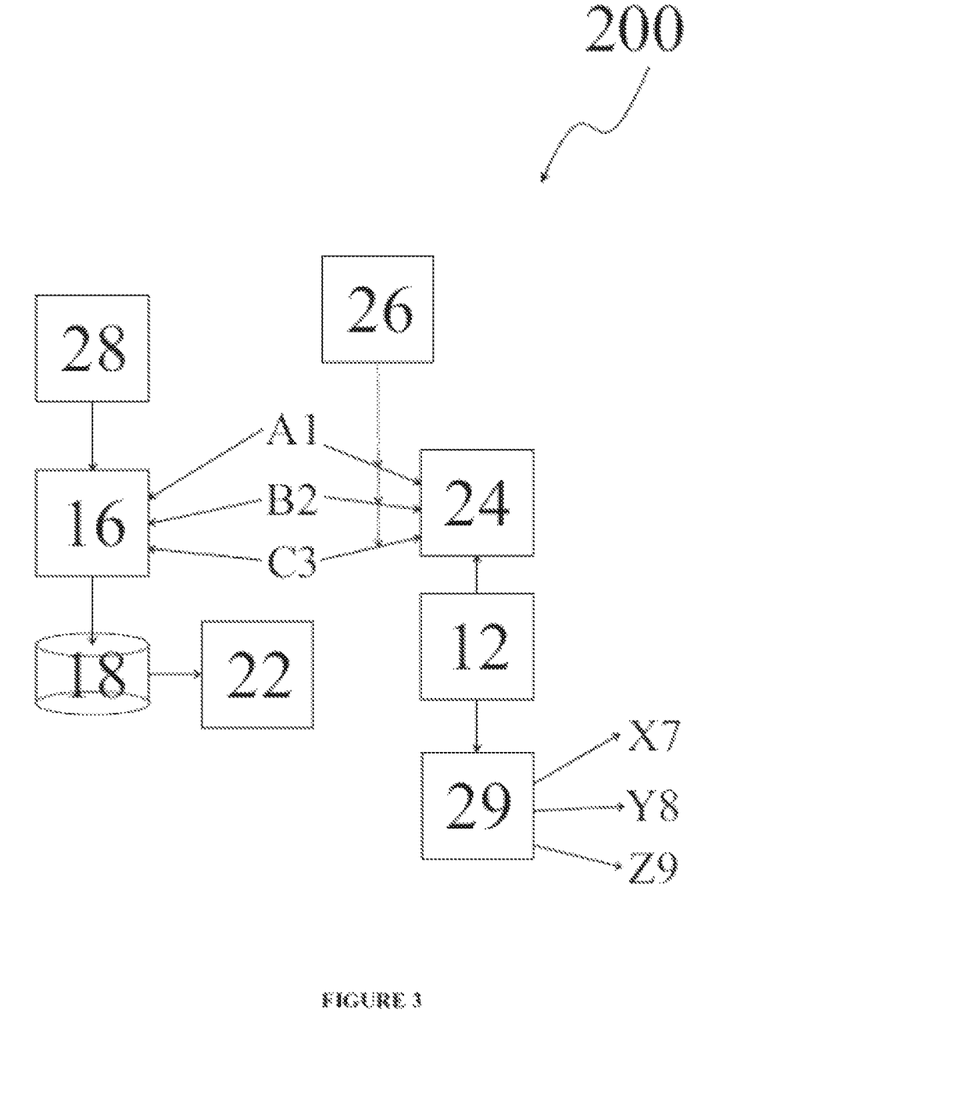
FIG. 3 illustrates a system/module for accumulating points and incentivizing word of mouth propaganda.

In accordance with an embodiment of this invention, there is provided a system/module for accumulating points and incentivizing word of mouth propaganda (200).

FIG. 3 illustrates a system/module for accumulating points and incentivizing word of mouth propaganda (200).

In accordance with an embodiment of the system/module for accumulating points and incentivizing word of mouth propaganda (200), there is provided a point distribution mechanism (22) adapted to allow distribution of points, from a points' bank (18) in accordance with pre-defined point allocation protocol or rules in relation to activities carried out by a user on on-line media or on off-line media. In on-line media, the social media plugin (16) allows the system to track activities. In off-line media, reference numeral allows the system to track activities. Each activity needs to be coordinated with a reference numeral in order to enable tracking. The system, hence, incentivizes a user to log on to social media and perform online and offline activities (for example A1, B2, C3) in order to collate points. For each activity of the user, system awards the user with WOM points. The activities may relate to buying a product and concurrently liking the product on a social media page and sharing the like, reviewing the product on the social media page and sharing the review, rating the product on the social media page and sharing the rating, participating in a survey relating to a social media page and broadcasting the survey, recommending the product to network of friends on the social media page, some kind of social engagement, gamification (gamify) and the like. Number of WOM points may be system-defined or Brand-defined. The term product used in this embodiment is deemed to include a service, a brand or a company associated with any product or otherwise.

In accordance with an embodiment of the system/module for accumulating points and incentivizing word of mouth propaganda, points may be accrued against a user or identity before actual distribution of points.

In accordance with an embodiment of the system/module for accumulating points and incentivizing word of mouth propaganda (200), there is provided a referral link generator (24) which generates a referral link encoded with the tracking reference numeral provided by the tracking reference numeral generator (12). Along with each online activity of a user using the system, a referral link along with a tracking reference numeral generator is tagged in the activity, using a tagging mechanism (26). According to a non-limiting exemplary embodiment, upon an activity of sharing a product review, system generates a compressed URL on the shared template of like/review/rate/recommend, which URL leads a new user who reads the like/review/rate/recommend and clicks on the URL to a landing page in relation to the product or the company of the product or the like, wherein, the new user is incentivized to sign-up by offering WOM points.

In accordance with an embodiment of the system/module for accumulating points and incentivizing word of mouth propaganda (200), there is provided an analytics engine (28) adapted to analyze placement of advertisement and link of reference from placement of advertisement to referrer to receiver. This allows the system to 'UNDERSTAND' links of reference.

In accordance with an embodiment of the system/module for accumulating points and incentivizing word of mouth propaganda (200), there is provided a coupon generating mechanism (29) to provide coupons with reference numeral provided by the tracking reference numeral generator (12). These reference numerals are user-specific reference numerals, in that, the user details and user activity is captured while generating the reference numeral. These coupons are provided to users upon purchase which can be used for activities (X7, Y8, Z9) such as like/review/rate/recommend so that authenticated for likes/reviews/rates/recommends are generated. Each of these activities in the online media needs to be clubbed with input of the reference numeral in order to obtain WOM points and in order to generate authenticated activities. Further, in cases of referrals, in the offline media, these coupons may be passed on in order to leave a trace of referral. Each user will be provided a pre-defined number of coupons with user-specific reference numerals adapted to be used to generate referral leads. In cases that positive referral leads are generated, a pre-defined first quantum of points may be provided to the referrer. In cases that neutral referral leads are generated, a pre-defined second quantum of points may be provided to the referrer. Hence, the system aids the user to push a product or service. Moreover, the system aids the user to act in the online media and offline media, in an authenticated manner, in relation to a product or service. Additionally, the system prevents non-users or rogues from commenting or partaking in any activity in relation to a product or service without actual use of the product or service.

In accordance with an embodiment of the system/module for accumulating points and incentivizing word of mouth propaganda (200), is linked to a accumulated points and incentive database that stores WOM points, coupons, reference numbers, rewards and the like or indexes/links it to one or more users.

Figure 4:
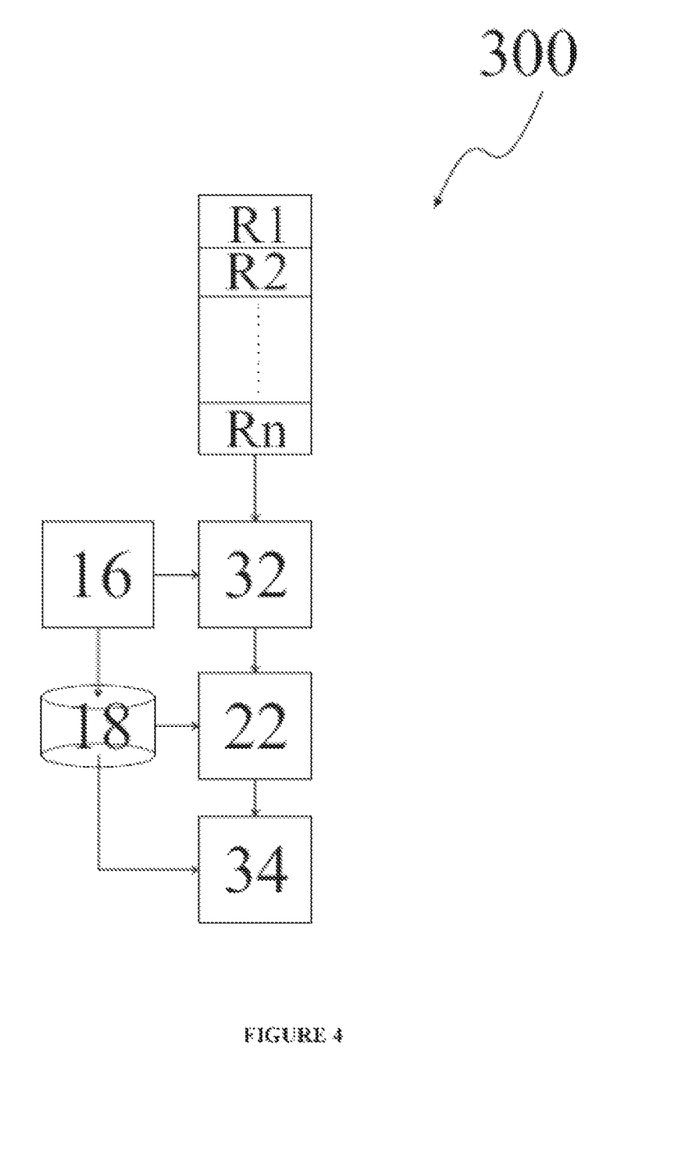
FIG. 4 illustrates a system/module for WOM membership platform.

In accordance with an embodiment of this invention, there is provided a system/module for WOM membership platform (300) as illustrated in FIG. 4.

In accordance with an embodiment of the system/module for WOM membership platform (300), there is provided a membership status provisioning mechanism (32) adapted to adjudicate membership status to users based on pre-defined parameters of social media plugin (16) or online activity or offline activity in relation to activities or referrals or both. Further, the membership status may include levels of membership adapted to be accessed by a user based on pre-defined rules (R1, R2, . . . , Rn) of activation in correlation with analyses received by the analytics' engine. Therefore, a relatively more active user who has been adjudicated membership may gain relatively more WOM points and a relatively more connected or influential (by means of referrals) user who has been adjudicated membership may gain relatively more WOM points in comparison to Non-Members. Also, therefore, a relatively more active user may gain a pre-defined level of access in correlation with level of activity for the purpose of membership; a relatively more connected or influential (by means of referrals) user may gain a pre-defined level of access in correlation with level of connection or influence for the purpose of membership.

In accordance with an embodiment of the system/module for WOM membership platform (300), there is provided a dynamic redemption mechanism (34) adapted to allow members to dynamically allow usage of WOM points, in that, each WOM point may be dynamically valued in relation to pre-defined parameters for each user.

In accordance with an embodiment of the system/module for WOM membership platform (300), there is provided a mechanism to send communication to a user who has been adjudicated membership, by an electronic device.

In accordance with an embodiment of the system/module for WOM membership platform (300), there is provided a mechanism to send offers to a user who has been adjudicated membership, by an electronic device.

In accordance with an embodiment of the system/module for WOM membership platform (300), there is provided a mechanism to send alerts to a user who has been adjudicated membership, by an electronic device.

In accordance with an embodiment of the system/module for WOM membership platform (300), there is provided a mechanism to send coupons to a user who has been adjudicated membership, by an electronic device.

According to a non-limiting exemplary embodiment, each user who has bought a product or a service is provided with a WOM membership (physical or virtual) card comprising accumulated WOM points. Further, a user who has bought the product or service is provided with reference cards/mobile coupons with user-specific unique reference numerals for distribution to network/friends/social circle. These user-specific unique reference numerals are track-able codes and specific to the user. Friends who purchase the product can use the reference numeral on the reference cards/mobile coupons to obtain discounts. Hence, user 'reference' can be tracked and its strength can be assessed. The user may also submit membership number of referrer. The system, hence, understands the referrer. Upon accumulation of points, system actuates a dynamic redemption mechanism which allows a user to redeem points based on a dynamic manner pre-decided by pre-determined parameters of the user. The parameters may include friend connection of user on a social media site, accessibility of user on various social media sites, area of social circle impact of the user based on previous purchases, activity, recommendation, friend purchases, and the like. Hence, in an example, one user with relatively more social standing may be able to redeem Rs. 1000 for each 100WOM points, while another user with relatively less social standing may be able to redeem Rs. 200 for each 100WOM points. Also, each user's social standing may change and hence redeem-ability quotient may also be changed. Reference cards (virtual/physical) may also be provided to special persons such as architects, retailers, dealers, influencers, affiliates which reference cards comprise unique user-specific unique-codes and discounts. These reference cards are to be used by persons whom the architect deems fit to give.

The system is equipped to understand the purchase power parity of each user. The system is equipped to understand the recommendation power parity of each user.

Figure 5:
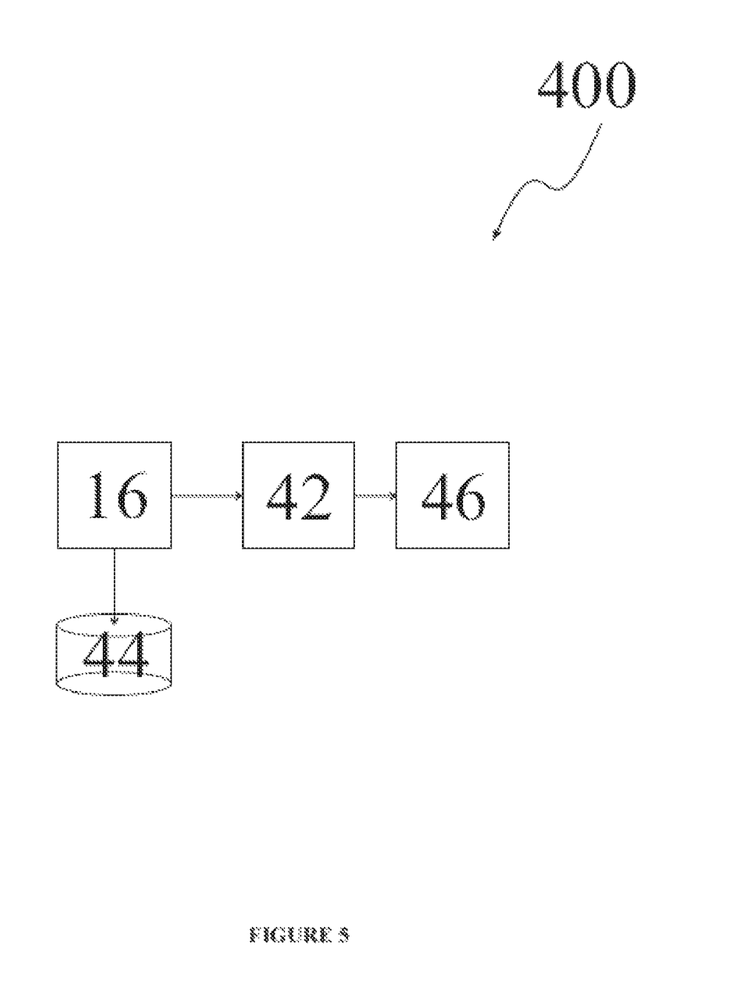
FIG. 5 illustrates a system/module for WOM counts equity program.

In accordance with an embodiment of this invention, there is provided a system/module for WOM counts equity program (400) as illustrated in FIG. 5.

In accordance with the system/module for WOM counts equity program (400), there is provided a user score defining means (42) adapted to define user score, allocated from a user score database (44), in relation to pre-defined parameters in correlation with user based activity in the online media as well as in the offline media. Each activity of a user is provided a pre-defined number of points which represent user score.

In accordance with the system/module for WOM counts equity program (400), there is provided an equity distribution means (46) adapted to distribute equity in a company providing products or services or in an equity platform other than a company. The equity may be provided in correlation with user score. Hence, the system awards equity in the company which facilitates the WOM count program so that over a period of time, user score translates into monetary benefits based on equity. Equity score may be based on pre-defined parameters, such as—what time one enters the WOM count program, what is the strength quotient of referrals and the like.

In accordance with the system/module for WOM counts equity program (400), a user may get units of shares or equity which may have a share value or a net asset value which may alter in time.

In accordance with the system/module for WOM counts equity program (400), a user may purchase units of shares or equity which may have a share value or a net asset value which may alter in time.

In accordance with the system/module for WOM counts equity program (400), a user may sell units of shares or equity which may have a share value or a net asset value which may alter in time.

In accordance with the system/module for WOM counts equity program (400), a user may exchange units of shares or equity with points.

In accordance with the system/module for WOM counts equity program (400), a user may exchange units of shares or equity with coupons.

In accordance with the system/module for WOM counts equity program (400), a user may exchange units of shares or equity with offers.

Figure 6:
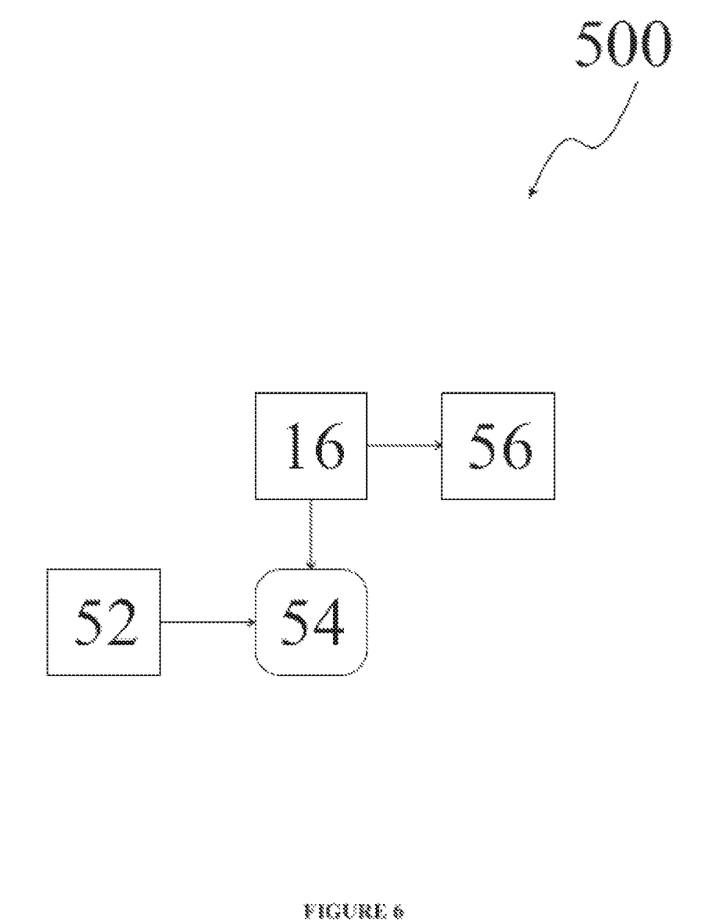
FIG. 6 illustrates a system/module for brand assurance.

In accordance with an embodiment of this invention, there is provided a system/module for brand assurance (500) as illustrated in FIG. 6.

In accordance with an embodiment of the system/module for brand assurance (500), there is provided a recommendation module (52) adapted to include a recommendation engine (54) trained to provide recommendations to a user regarding a brand based on pre-defined parameters of the user. These pre-defined parameters may be based on the user's social graph index and history, accessed from social media plugin (16), which enables the system to provide data to a plurality of companies to target a user. The social graph index, preferably, may be able to provide data relating to user purchasing power parity, user consumption patter, user buying pattern, user service pattern, user activity pattern, user reference pattern, and the like.

In an example of systems and methods of the invention, at the buying stage, a user is provided with a) WOM points b) score for equity c) coupons of associated equipment/ products/services of same company or affiliated companies. The affiliation may be defined by the system or the companies, themselves. According to a non-limiting exemplary embodiment, a user buys a product A from Brand A. The recommendation module, having data regarding user preferences and patterns, provides recommendations to companies for pitching certain products or services to the user and also provides recommendations directly to users directly of complementing brands with incentivizing WOM points. In addition, discounts to user may be given. The offers or recommendations may be dynamic based on pre-defined parameters—whether previously bought product, Social Graph Index, and the like.

In accordance with an embodiment of the system/module for brand assurance (500), there is provided a brand linking platform. The brand linking platform enables linking of at least two brands, wherein the said at least two brands, herein for the purpose of example may be referred to as a first brand and a second brand, may be linked to each other to enable one or more activities such as but not limited to:
  a. providing WOM Reward associated with the second brand to a user if a WOM Reward associated with the first brand is provided
  b. providing WOM Reward associated with the second brand to a user if a WOM Reward associated with the first brand is utilized
  c. providing WOM Reward associated with the second brand to a user if a WOM Reward associated with the first brand is exchanged
  d. providing WOM Reward associated with the second brand to a user if a WOM Reward associated with the first brand is redeemed
  e. providing WOM Reward associated with the second brand to a user if a sales lead associated with the first brand is generated; or a combination thereof In accordance with an embodiment of the invention, WOM Reward is selected from a set of coupon, points, discounts, offers, gifts, equity or a combination thereof.

In accordance with an embodiment of the system/module for brand assurance (500), there is provided a trading platform (56) adapted to allow various companies and brands to trade their WOM points for data acquired by the system.

It is to be understood that, in some instances, a Retailer may be defined to act as User (to collect WOM points) as well as Brands (to disburse WOM points).

Figure 7:
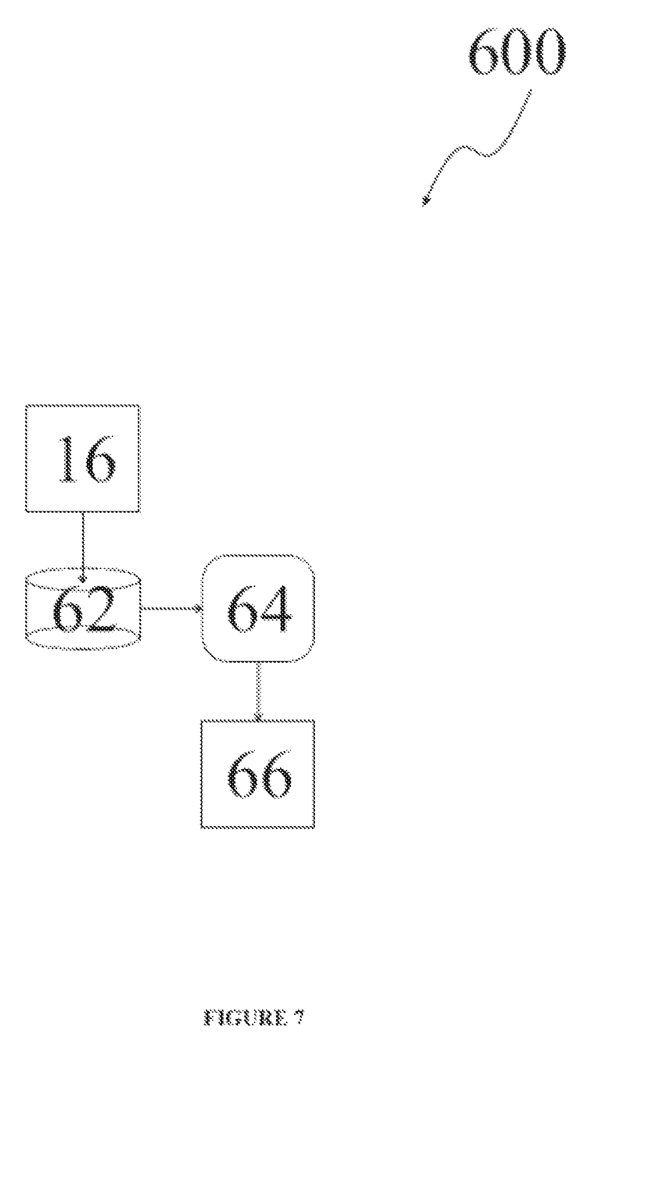
FIG. 7 illustrates a system/module for creating certified and ranked registry of users.

In accordance with an embodiment of this invention, there is provided a system/module for creating certified and ranked registry of users (600).

FIG. 7 illustrates a system/module for creating certified and ranked registry of users (600).

In accordance with the system/module for creating certified and ranked registry of users (600), there is provided a first database (62) adapted to store user details along with transaction history. With each transaction, user history is recorded. This database is updateable with each transaction. Due to social media plugin (16), each user's identity is captured whilst generating an invoice and while effecting a transaction.

In accordance with the system/module for creating certified and ranked registry of users (600), there is provided a transaction score computation means (64) adapted to compute a transaction score in relation to each transaction for each user. If the transaction is a positive transaction (successfully executed), a positive score may be assigned. If the transaction is a negative transaction (fraudulent or not honored or return of goods in cases of Cash On Delivery), a negative score may be assigned.

There may also be a social behavior score based on pre-defined parameters of social behavior.

In accordance with the system/module for creating certified and ranked registry of users (600), there is provided a registry listing mechanism (66) adapted to list registry of users in a pre-defined format based on computed transaction score. The pre-defined format may include tagging each list. According to a non-limiting exemplary embodiment, the tags may be a white-list for users with a relatively higher transaction history, a black-list for users with a relatively lower transaction history, a grey-list for users with a relatively interim transaction history, and the like.

The registry listing mechanism may be adapted to further include the social behavior score in order to generate lists.

Thereby, in accordance with an embodiment of the invention, there is provided a system for authenticating, tracking, and rewarding word of mouth propagation comprising:
  a. system/module for accessing social graph index;
  b. system/module for accumulating points and incentivizing word of mouth propaganda;
  c. system/module for WOM membership platform;
  d. system/module for WOM counts equity program;

e. system/module for brand assurance; and f. system/module for creating certified and ranked registry of users;

wherein the system/module for accessing social graph index comprises:

i. a tracking reference numeral generator adapted to generate reference numerals for purposes of tracking and recording data and metadata related to an activity carried out by a user using a tracking mechanism; and ii. an 'interest and social pattern module' and an 'interest and social pattern database', wherein the 'interest and social pattern module' is used to correlate the data and metadata related to an activity carried out by a user tracked and recorded by the tracking mechanism with one or more interests or social behavior aspect of a user based on a predefined algorithm and a previously stored set of interests and social behavior aspects, wherein the previously stored set of interests and social behavior aspects are stored in the 'interest and social pattern database', and wherein after correlation of data and metadata related to an activity carried out by a user tracked and recorded by the tracking mechanism results into selection of one or more interest and social behavior aspect for said user which constitutes an 'interest and social pattern data-point' for said user, the 'interest and social pattern data-point' being stored in a social graph index database; and wherein the system/module for accumulating points and incentivizing word of mouth propaganda comprises:

i. a point distribution mechanism adapted to allow distribution of points, from a points' bank in accordance with pre-defined point allocation protocol or rules in relation to activities carried out by a user; and ii. a referral link generator which generates a referral link encoded with the tracking reference numeral provided by the tracking reference numeral generator, whereby along with each online activity of a user using the system, a referral link along with a tracking reference numeral generator is tagged in the activity, using a tagging mechanism; and wherein the system/module for accumulating points and incentivizing word of mouth propaganda is linked to an accumulated points and incentive database that stores WOM points, coupons, reference numbers, rewards and the like or indexes/links it to one or more users; and wherein the system/module for WOM membership platform comprises a membership status provisioning mechanism adapted to adjudicate membership status to users based on pre-defined parameters; and wherein the system/module for WOM counts equity program comprises:

i. a user score defining means (42) adapted to define user score, allocated from a user score database (44), in relation to pre-defined parameters in correlation with user based activity in the online media as well as in the offline media, whereby each activity of a user is provided a pre-defined number of points which represent user score; and ii. an equity distribution means (46) adapted to distribute equity in a company providing products or services or in an equity platform other than a company; and wherein the system/module for brand assurance comprises a recommendation module (52) adapted to include a recommendation engine (54) trained to provide recommendations regarding a brand to a user based on pre-defined parameters of the user; and wherein the system/module for creating certified and ranked registry of users comprises a first database adapted to store user details along with transaction history, whereby with each transaction, user history is recorded and this first database is updateable with each transaction.

In accordance with an embodiment of this invention, there is provided a method for authenticating, tracking, and rewarding word of mouth propagation, the method comprising the steps of:

a. generating reference numerals by a tracking reference numeral generator of a system/module for accessing social graph index, for purposes of tracking and recording data and metadata related to an activity carried out by a user;

b. tracking and recording data and metadata related to an activity carried out by a user using a tracking mechanism using the reference numerals;

c. correlating of said data and metadata with one or more interests or social behavior aspect of a user based on a predefined algorithm and a previously stored set of interests and social behavior aspects, wherein the correlating is carried out by an 'interest and social pattern module' of the system/module for accessing social graph index, wherein the previously stored set of interests and social behavior aspects are stored in the 'interest and social pattern database';

d. selecting of one or more interest and social behavior aspect for said user which constitutes an 'interest and social pattern data-point' for said user and storing the 'interest and social pattern data-point' for said user in a social graph index database;

e. distributing of points, from a points' bank in accordance with pre-defined point allocation protocol or rules in relation to activities carried out by a user by a point distribution mechanism of a system/module for accumulating points and incentivizing word of mouth propaganda;

f. generating a referral link by a referral link generator of the system/module for accumulating points and incentivizing word of mouth propaganda, the referral link being encoded with the tracking reference numeral provided by the tracking reference numeral generator, whereby along with each online activity of a user using the system, a referral link along with a tracking reference numeral generator is tagged in the activity, using a tagging mechanism;

g. storing WOM points, coupons, reference numbers, rewards and the like or indexes/links it to one or more users in an accumulated points and incentive database which is linked to the system/module for accumulating points and incentivizing word of mouth propaganda;

h. adjudicating membership status to users by a membership status provisioning mechanism of system/module for WOM membership platform, based on pre-defined parameters;

i. defining user score by a user score defining means of a system/module for WOM counts equity program, the user score being allocated from a user score database, in relation to pre-defined parameters in correlation with user based activity in the online media as well as in the offline media, whereby each activity of a user is provided a pre-defined number of points which represent user score;

j. distributing equity in a company providing products or services or in an equity platform other than a company by an equity distribution means of the system/module for WOM counts equity program;

k. providing recommendations regarding a brand to a user based on pre-defined parameters of the user, by a recommendation engine of a recommendation module of a system/module for brand assurance; and
l. storing user details along with transaction history by a first database of a system/module for creating certified and ranked registry of users, whereby with each transaction, user history is recorded and this first database is updateable with each transaction.

In accordance with an embodiment of this invention, the method for authenticating, tracking, and rewarding word of mouth propagation, further comprises the step of prompting a user to allow the system to access a user's social media profile by a social media plugin, wherein the social media plugin is communicably coupled with a points' bank adapted to allow a user to collect pre-defined number of points for allowing social media access.

In accordance with an embodiment of this invention, the method for authenticating, tracking, and rewarding word of mouth propagation, further comprises the step of analyzing placement of advertisement and link of reference from placement of advertisement to referrer to receiver, the analyzing being done by an analytics engine of the system/module for accumulating points and incentivizing word of mouth propaganda.

In accordance with an embodiment of this invention, the method for authenticating, tracking, and rewarding word of mouth propagation, further comprises the step of providing coupons by a coupon generating mechanism of the system/module for accumulating points and incentivizing word of mouth propaganda, the coupons being provided with reference numeral provided by the tracking reference numeral generator.

In accordance with an embodiment of this invention, the method for authenticating, tracking, and rewarding word of mouth propagation, further comprises the step of allowing members to dynamically allow usage of WOM points by a dynamic redemption mechanism of the system/module for WOM membership platform, in that, each WOM point may be dynamically valued in relation to pre-defined parameters for each user.

In accordance with an embodiment of this invention, the method for authenticating, tracking, and rewarding word of mouth propagation, further comprises the step of sending communication to a user who has been adjudicated membership, by an electronic device by a mechanism of the system/module for WOM membership platform.

In accordance with an embodiment of this invention, the method for authenticating, tracking, and rewarding word of mouth propagation, further comprises the step of linking of at least two brands by a brand linking platform of the system/module for brand assurance, wherein the said at least two brands, herein referred to as a first brand and a second brand, may be linked to each other to enable one or more activities such as but not limited to:
  a. providing WOM Reward associated with the second brand to a user if a WOM Reward associated with the first brand is provided;
  b. providing WOM Reward associated with the second brand to a user if a WOM Reward associated with the first brand is utilized;
  c. providing WOM Reward associated with the second brand to a user if a WOM Reward associated with the first brand is exchanged;
  d. providing WOM Reward associated with the second brand to a user if a WOM Reward associated with the first brand is redeemed;
  e. providing WOM Reward associated with the second brand to a user if a sales lead associated with the first brand is generated; and a combination thereof; and
    wherein a WOM Reward is selected from a set of coupon, points, discounts, offers, gifts, equity and a combination thereof.

In accordance with an embodiment of this invention, the method for authenticating, tracking, and rewarding word of mouth propagation, further comprises the step of computing a transaction score in relation to each transaction for each user by a transaction score computation means of the system/module for creating certified and ranked registry of users.

In accordance with an embodiment of this invention, the method for authenticating, tracking, and rewarding word of mouth propagation further comprises the step of sharing of WOM points, coupons, reference numbers, rewards and the like by a user with another user using a Sharing Module of the system/module for accumulating points and incentivizing word of mouth propaganda.

In accordance with an embodiment of this invention, the system for authenticating, tracking, and rewarding word of mouth propagation, wherein the system/module for accumulating points and incentivizing word of mouth propaganda further comprises a Sharing Module which enables sharing of WOM points, coupons, reference numbers, rewards and the like by a user with another user.

In accordance with an embodiment of this invention, the method for authenticating, tracking, and rewarding word of mouth propagation further comprises the step of indexing a device used by a user while accessing the system of the present invention, by the system/module for accessing social graph index. The step of indexing device may employ any acceptable or commonly practiced indexing mechanism such as but not limited to cookie planting and tracking.

In accordance with an embodiment of this invention, the method for authenticating, tracking, and rewarding word of mouth propagation further comprises the step of clubbing or joining identities of one or more users accessing the system of the present invention, by the system/module for accessing social graph index. The identity may be any identity such as but not limited to telephone number.

According to a method of this invention, in place of all the actions that happen after a user buys a product, the same may happen once he/she drops it in a shopping cart.

In an embodiment of the invention, the systems and methods of the present invention may be applicable to merchandise as well as donation or cause marketing.

In an embodiment of the invention, same or different WOM rewards shall be given to first successful referral and consequently to each successful referral.

In an embodiment of the invention, the systems and methods of the present invention may be applicable to a user during the stage of path to purchase or pre-purchase or post-purchase.

For the purpose of the present invention the term provides or providing may be used in substitution or reference of the term 'comprising'.

In an embodiment of the invention, a user may be a consumer, a seller, a company, a retailer or a broker or any person accessing a social network.

In an embodiment of the invention, there is provided a computer program product for facilitation of authenticating, tracking, and rewarding word of mouth propagation, the computer program product embodied in a computer readable medium that, when executing on a computer, performs steps comprising:

a. generating reference numerals by a tracking reference numeral generator of a system/module for accessing social graph index, for purposes of tracking and recording data and metadata related to an activity carried out by a user;
b. tracking and recording data and metadata related to an activity carried out by a user using a tracking mechanism using the reference numerals;
c. correlating of said data and metadata with one or more interests or social behavior aspect of a user based on a predefined algorithm and a previously stored set of interests and social behavior aspects, wherein the correlating is carried out by an 'interest and social pattern module' of the system/module for accessing social graph index, wherein the previously stored set of interests and social behavior aspects are stored in the 'interest and social pattern database';
d. selecting of one or more interest and social behavior aspect for said user which constitutes an 'interest and social pattern data-point' for said user and storing the 'interest and social pattern data-point' for said user in a social graph index database;
e. distributing of points, from a points' bank in accordance with pre-defined point allocation protocol or rules in relation to activities carried out by a user by a point distribution mechanism of a system/module for accumulating points and incentivizing word of mouth propaganda;
f. generating a referral link by a referral link generator of the system/module for accumulating points and incentivizing word of mouth propaganda, the referral link being encoded with the tracking reference numeral provided by the tracking reference numeral generator, whereby along with each online activity of a user using the system, a referral link along with a tracking reference numeral generator is tagged in the activity, using a tagging mechanism;
g. storing WOM points, coupons, reference numbers, rewards and the like or indexes/links it to one or more users in an accumulated points and incentive database which is linked to the system/module for accumulating points and incentivizing word of mouth propaganda;
h. adjudicating membership status to users by a membership status provisioning mechanism of system/module for WOM membership platform, based on pre-defined parameters;
i. defining user score by a user score defining means of a system/module for WOM counts equity program, the user score being allocated from a user score database, in relation to pre-defined parameters in correlation with user based activity in the online media as well as in the offline media, whereby each activity of a user is provided a pre-defined number of points which represent user score;
j. distributing equity in a company providing products or services or in an equity platform other than a company by an equity distribution means of the system/module for WOM counts equity program;
k. providing recommendations regarding a brand to a user based on pre-defined parameters of the user, by a recommendation engine of a recommendation module of a system/module for brand assurance; and
l. storing user details along with transaction history by a first database of a system/module for creating certified and ranked registry of users, whereby with each transaction, user history is recorded and this first database is updateable with each.

The terms used herein if not defined shall deem to have their conventional meaning as in ordinary practice in industry and commerce.

The data, in each of the means of the system and method of this invention, may be 'encrypted' and suitably 'decrypted' when required.

In an embodiment of the invention, a social media facility is selected from a set of but not limited to Zooppa, Zoo.gr, Yelp, Inc., Yammer, Xt3, XING, Xanga, WriteAPrisoner.com, WiserEarth, Windows Live Spaces, weRead, Werkennt-wen, WeOurFamily, WeeWorld, WebBiographies, WAYN, Wasabi, Wattpad, Wakoopa, Vox, Virb, Viadeo, Vampirefreaks.com, Vkontakte, Twitter, Tumblr, Tuenti, Trombi.com, tribe.net, Travellerspoint, TravBuddy.com, TermWiki, TeachStreet, Taringa!, Taltopia, Talkbiznow, TalentTrove, Tagged, StumbleUpon, StudiVZ, Stickam, SoundCloud, Sonico.com, SocialVibe, Social_Life_(website), Skyrock, Shelfari, ShareTheMusic, Scispace.net, ScienceStage, Ryze, ReverbNation.com, ResearchGate, Renren, Ravelry, Raptr, Qzone, Quechup, Qapacity, Present.ly, Plurk, Playlist.com, Playfire, PureVolume, Playahead, Plaxo, Pingsta, Partyflock, PatientsLikeMe, Passportstamp, OUTeverywhere, Orkut, Open Diary, OneWorldTV, OneClimate, Odnoklassniki, Ning, NGO Post, Nexopia, Nettby, Netlog, Nasza-klasa.pl, myYearbook, Myspace, My Opera, MyLife, MyHeritage, MyAnimeList, Muxlim, Multiply, Mubi (website), MouthShut.com, MOG, MocoSpace, mobikade, Mixi, Meettheboss, Meetup.com, MEETin, Makeoutclub, LunarStorm, Livemocha, LiveJournal, Listography, LinkExpats, LinkedIn, Lifeknot, LibraryThing, Last.fm, LaiBhaari, Lafango, Kiwibox, Kaixin001, Jaiku, iWiW, Itsmy, InterNations, italki.com, IRC-Galleria, Indaba Music, Identi.ca, Ibibo, Hyves, Hub Culture, HR.com, Hotlist, Hospitality Club, hi5, Habbo, Grono.net, GovLoop, Google Buzz, Google+, Goodwizz, Goodreads, Gogoyoko, Geni.com, Gays.com, Gather.com, GamerDNA, Gaia Online, Fubar, Frühstückstreff, Friendster, Friends Reunited, Foursquare, Fotolog, Fotki, Focus.com, Flickr, Flixster, FledgeWing, FilmAffinity, Fetlife, Faces.com, Faceparty, Facebook, Exploroo, Experience Project, Eons.com, instagram, Epernicus, Elftown, DXY.cn, douban, Draugiem.lv, DontStayIn, Dol2 day, Disaboom, deviantART, delicious, Decayenne, DailyStrength, DailyBooth, Cyworld, Crunchyroll, Cross.tv, CozyCot, CouchSurfing, Cloob, Classmates.com, Cellufun, CaringBridge, Care2, Cake Financial, CafeMom, Buzznet, Bolt.com, Blogster, Blauk, BlackPlanet, Biip.no, BIGADDA, Bebo, Badoo, Avatars United, Audimated.com, Athlinks, AsianAvenue, aSmallWorld, aNobii, Advogato, Academia.edu, blogs, or any combination thereof.

The systems of the present invention in an embodiment are made accessible through a portal or an interface which is a part of, or may be connected to, the internet or World Wide Web or any similar portal, wherein the portals or interfaces are accessed by one or more of users through an electronic device, whereby the user may send and receive data to the portal or interface which gets stored in at least one memory device or at least one data storage device or at least one server, and utilizes at least one processing unit. The portal or interface in combination with one or more of memory device, data storage device, processing unit and serves, form an embedded computing setup, and may be used by, or used in, one or more of a computer program product. In an embodiment of the invention, the embedded computing setup and optionally one or more of a computer program product, in relation with, and in combination with the said portal or interface forms one of the systems of the invention. Typical examples of a portal or interface may be selected from but is not limited to a website, an executable software program or a software application.

In an embodiment of the invention, the systems and methods of the invention may simultaneously involve more than one user or more than one data storage device or more than one host server or any combination thereof.

In an embodiment of the invention, a user may provide user input through any suitable input device or input mechanism such as but not limited to a keyboard, a mouse, a joystick, a touchpad, a virtual keyboard, a virtual data entry user interface, a virtual dial pad, a software or a program, a scanner, a remote device, a microphone, a webcam, a camera, a fingerprint scanner, pointing stick.

In an embodiment of the invention, the systems and methods can be practiced using any electronic device which may be connected to one or more of other electronic device with wires or wirelessly which may use technologies such as but not limited to, Bluetooth, WiFi, WiMax. This will also extend to use of the aforesaid technologies to provide an authentication key or access key or electronic device based unique key or any combination thereof.

In an embodiment of the invention, the systems and methods can be practiced using any electronic device which may contain or may be infected by one or more of an undesirable software such as but not limited to a virus, or a Trojan, or a worm, malware, spyware, adware, scareware, crimeware, rootkit or any combination thereof.

In an embodiment of the invention, the system may involve software updates or software extensions or additional software applications.

In an embodiment of the invention, any form of internet security such as but not limited to, a firewall or antivirus or antimalware or registry protection can be used by a user in the same or different electronic device either simultaneously or separately, along with the systems or methods of the present invention.

In an embodiment of the invention, one or more user can be blocked or denied access to one or more of the aspects of the invention.

In an embodiment of the invention, the "social media activity data and metadata" may be stored or processed or exchanged in encrypted or coded or encoded or scrambled or translated or ciphered form or cryptographic form.

The term 'pre-defined' with respect to a component or data or item or program means that a particular component or data or item or program or indicia is defined at an instant prior to the instant of using the component or data or item or program, which may be done by a system or a user.

In an example of the invention, a first user who accesses a social network website and comments on a product of a particular brand shall be distributed 100 WOM points by the system of this invention by the system/module for accumulating points and incentivizing word of mouth propaganda. On becoming a member using the system/module for WOM membership platform the user will be provided 100 counts of equity which may be referred to 100 WOM counts. On each comment or referral of any particular brand user will be provided with additional 100 WOM points (where the particular brand is also another user and member of the system using the system/module for WOM membership platform). The activities of user will be tracked by the tracking reference numeral generator and generate a social graph index for the user stored in including geo the social graph index database, based on which certain advertisements and posts shall be made applicable to the user. A referral link will be generated by the referral link generator. If a third user accesses the system or carries out any activity where the said referral link is identified (thereby enabling Word of Mouth propagation), additional WOM points and optionally WOM counts will be provided to the first user. Once the third user publishes that he has purchased a product of a brand user, he shall also be given WOM points and WOM equity. The system of the present invention will then use the system/module for brand assurance to provide coupons and offers of a second brand user to the third user. The system/module for creating certified and ranked registry of users will compute a transaction score in relation to each transaction for each user.

The term 'encrypt', 'encrypted' or 'encryption' means the process of converting digital information into a new form using a key or a code or a program, wherein the new form is unintelligible or indecipherable to a user or a thief or a hacker or a spammer. The term 'encryption' includes encoding, compressing, or any other translating of the digital content. The encryption of the digital media content is performed in accordance with an encryption/decryption algorithm. The encryption/decryption algorithm utilized is not hardware dependent and may change depending on the digital content. For example, a different algorithm may be utilized for different websites or programs. The term 'encryption' further includes one or more aspects of authentication, entitlement, data integrity, access control, confidentiality, segmentation, information control, and combinations thereof.

The described embodiments may be implemented as a system, method, apparatus or article of manufacture using standard programming and/or engineering techniques related to software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

In an embodiment of the invention, the term network means a system allowing interaction between two or more electronic devices, and includes any form of inter/intra enterprise environment such as the world wide web, Local Area Network (LAN), Wide Area Network (WAN), Storage Area Network (SAN) or any form of Intranet.

In an embodiment of the invention, the systems and methods can be practiced using any electronic device. An electronic device for the purpose of this invention is selected from any device capable of processing or representing data to a user and providing access to a network or any system similar to the internet, wherein the electronic device may be selected from but not limited to, personal computers, mobile phones, laptops, palmtops, portable media players and personal digital assistants.

In an embodiment of the invention, computer program code for carrying out operations or functions or logic or algorithms for aspects of the present invention may be written in any combination of one or more programming languages which are either already in use or may be developed in future, such as but not limited to Java, Smalltalk, C++, C, Foxpro, Basic, HTML, PHP, SQL, Javascript, COBOL, Extensible Markup Language (XML), Pascal, Python, Ruby, Visual Basic.NET, Visual C++, Visual C#.Net, Python, Delphi, VBA, Visual C++.Net, Visual FoxPro, YAFL, XOTcl, XML, Wirth, Water, Visual DialogScript, VHDL, Verilog, UML, Turing, TRAC, TOM, Tempo, Tcl-Tk, T3X, Squeak, Specification, Snobol, Smalltalk, S-Lang, Sisal, Simula, SGML, SETL, Self, Scripting, Scheme, Sather, SAS, Ruby, RPG, Rigal, Rexx, Regular Expressions, Reflective, REBOL, Prototype-based, Proteus, Prolog, Prograph, Procedural, PowerBuilder, Postscript, POP-11, PL-SQL, Pliant, PL, Pike, Perl, Parallel, Oz, Open Source, Occam, Obliq, Object-Oriented, Objective-C, Objective CamI, Obfuscated, Oberon, Mumps, Multiparadigm, Modula-3, Modula-2, ML, Miva, Miranda, Mercury, MATLAB, Markup, m4, Lua, Logo, Logic-based, Lisp (351), Limbo, Leda, Language-OS Hybrids, Lagoona, LabVIEW, Interpreted, Interface, Intercal, Imperative, IDL, Id, ICI, HyperCard, HTMLScript, Haskell, Hardware Description, Goedel, Garbage Collected, Functional, Frontier, Fortran, Forth, Euphoria, Erlang, ElastiC, Eiffel, E, Dylan, DOS Batch, Directories, Declarative, Dataflow, Database, D, Curl, C-Sharp, Constraint, Concurrent, Component Pascal, Compiled, Comparison and Review, Cocoa, CobolScript, CLU, Clipper, Clean, Clarion, CHILL, Cecil, CamI, Blue, Bistro, Bigwig, BETA, Befunge, BASIC, Awk, Assembly, ASP, AppleScript, APL, Algol 88, Algol 60, Aleph, ADL, ABEL, ABC, or similar programming languages.

In an embodiment, the data storage unit or data storage device is selected from a set of but not limited to USB flash drive (pen drive), memory card, optical data storage discs, hard disk drive, magnetic disk, magnetic tape data storage device, data server and molecular memory.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude or rule out the presence or addition of one or more other features, integers, steps, operations, elements, components, and/or groups thereof.

The process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

While this detailed description has disclosed certain specific embodiments of the present invention for illustrative purposes, various modifications will be apparent to those skilled in the art which do not constitute departures from the spirit and scope of the invention as defined in the following claims, and it is to be distinctly understood that the foregoing descriptive matter is to be interpreted merely as illustrative of the invention and not as a limitation.

I claim:

1. A method comprising:

generating, by a computer comprising one or more processors, in response to an activity performed by a first user on an online media platform, a tracking reference numeral tagged with the first user to track and record data and metadata pertaining to the activity carried out by the first user, wherein the activity pertains to sharing of a content item with a second user, said tracking reference numeral indicating a pre-defined format based encoded information comprising location of the online media platform where the recorded data and metadata of the activity is accessed, said tracking reference numeral being unique to said first user and to said activity carried out by said first user, wherein said tracking reference numeral aids in decoding the location of the online media platform that led to access to the first user;

in response to said activity being performed by said first user, correlating, by said computer, from a set of stored behavioral attributes, said recorded data and metadata with one or more behavioral attributes of said first user to select behavioral pattern data-points corresponding to the said activity for the first user;

in response to generation of the tracking reference numeral, generating, by said computer, through a plugin, based on the behavioral pattern data-points stored in a graph index database for the first user, a compressed URL that is encoded with the tracking reference numeral, wherein the activity carried out by the first user is tagged along with the compressed URL and with the tracking reference numeral, said compressed URL being unique to said tracking reference numeral and indicative of said activity carried out by the first user, wherein said compressed URL is accessed by the second user to carry out a second activity pertaining to sharing the content item with a third user on said compressed URL, said graph index database being generated based on a combination of a network aggregator, clickstream data of user, and geo-tagging, said compressed URL being accessed by the second user based on a recommendation made by a recommendation engine based on pre-defined parameters of the second user, and wherein the predefined parameters are based on the graph index database of the second user; and in response to the second activity carried out by the second user, determining, by said computer, activity pattern and preferences of the first user based on tracking of the activity carried out by the first user and the second activity carried out by the second user on the compressed URL.

* * * * *